United States Patent [19]

Lewis

[11] Patent Number: 4,475,356

[45] Date of Patent: Oct. 9, 1984

[54] BLOWDOWN APPARATUS AND METHOD

[76] Inventor: Hal B. Lewis, 3800 Plantation Dr., Greensboro, N.C. 27410

[21] Appl. No.: 477,511

[22] Filed: Mar. 21, 1983

[51] Int. Cl.³ .............................................. F25B 39/04
[52] U.S. Cl. ....................................... 62/183; 62/305; 261/26; 261/DIG. 11
[58] Field of Search ................. 62/171, 305, 181, 183; 261/26, 27, DIG. 11, DIG. 46

[56] References Cited

U.S. PATENT DOCUMENTS

| | | | |
|---|---|---|---|
| 2,158,869 | 5/1939 | Sperzel | 62/2 |
| 2,910,279 | 10/1959 | Wood | 261/24 |
| 3,094,133 | 6/1963 | Treanor | 137/101.11 |
| 3,196,892 | 7/1965 | Savage et al. | 137/114 |
| 3,282,277 | 11/1966 | Hayman | 137/3 |
| 3,365,909 | 1/1968 | Brainard | 62/305 |
| 3,443,916 | 5/1969 | Rolfe | 44/4 |
| 3,450,265 | 6/1969 | Kreusch et al. | 210/140 |
| 3,481,588 | 12/1969 | Lobb | 261/2 |
| 3,592,212 | 7/1971 | Schieimer et al. | 137/93 |
| 3,628,663 | 12/1971 | Derham | 210/141 |
| 3,754,741 | 8/1973 | Whitehurst | 137/88 |
| 3,788,340 | 1/1974 | O'Leary et al. | 137/93 |
| 3,911,060 | 10/1975 | Bradley, Jr. et al. | 261/27 |
| 4,049,012 | 9/1977 | van de Kooi | 137/3 |
| 4,353,219 | 10/1982 | Patrick, Jr. | 62/183 |

OTHER PUBLICATIONS

Research Control Valves, Badger Meter, Inc., bulletin 940, 493-5/82-10M, 6116 East 15th Street, Tulsa, Okla. 74112.

Condensed Catalog, Honeywell, No. 10-00-30-01-/9-80, 1100 Virginia Drive, Fort Washington, Pa. 19034.

Abandoned U.S. patent application Ser. No. 687,953, Water Treatment System, filed 5/19/76.

Primary Examiner—Harry Tanner

[57] ABSTRACT

The invention presented herein provides an improved method for controlling the blowdown of recirculating water for an industrial cooling system or the like, in direct proportion to the heat load on refrigeration systems. A temperature probe is positioned in the recirculating water which is in communication with a blowdown valve. As the heat load on the system increases the temperature of the cooling water increases and the blowdown valve is then regulated to release more of the circulating water. Additional makeup water and chemicals may be also supplied to the cooling system to maintain a proper chemical balance.

In the preferred embodiment of the invention the probe is positioned between the refrigerant condenser and the cooling tower in the circulating water system. Appropriate chemical feed systems and makeup water can be regulated to function in relation to the amount of blowdown to insure that the desired chemical balance is maintained.

8 Claims, 2 Drawing Figures

BLOWDOWN APPARATUS AND METHOD

BACKGROUND AND OBJECTIVES OF THE INVENTION

Cooling water systems are found in many different commercial and industrial installations, including power generating stations, petroleum refineries, steel mills, chemical plants, textile plants, commercial refrigeration plants and central air-conditioning systems for office buildings and factories. At these installations three principal types of cooling systems are used.

Once-through systems are sometimes used in which water is taken from a primary source, is used for cooling, and is then discharged into waste or thereafter is used for other purposes.

The second type of cooling water system is a "closed recirculating system" in which all water is continually recycled and heat is removed by means of a heat exchanger that may be cooled by air, a refrigerant gas such as freon or by a separate open cooling system.

The third type of cooling water system is an "open recirculating system" in which a main portion of the water used for process cooling is continuously recycled to an evaporative cooling device such as a cooling tower whereby heat is removed from the processed water where it is returned for cooling purposes. The present invention concerns this type of open recirculating cooling water system.

Open recirculating water systems are frequently used because they not only provide economical heat removal but by recirculation of the water conservation is accomplished with substantial cost reductions. Additionally, less chemicals are used for treatment of the water which also provides for savings. The only water lost from such a system is lost by evaporation in the removal of excess heat, droplets of water captured by the moving air during cooling and the water removed by intentional or accidental purging of the system. Thus the amount of water required for makeup is reduced and money saved.

All water contains small amounts of dissolved solids that will deposit as scale on heat trasfer surfaces if allowed to concentrate in the circulating water of cooling water systems. As a result of the evaporation of circulating water in such systems as it passes through a cooling tower or the like the dissolved solids concentrate in the basin water. As these concentrates increase, additional amounts of chemicals are added to hold the dissolved solids in suspension. The cost of chemically treating the water can be prohibitive and a point is reached where the dissolved solids become so concentrated that chemical treatment is ineffective.

Fresh or makeup water is relatively low in dissolved solids and therefore can be used to dilute the highly concentrated basin water to thereby lower the dissolved solids content. Water can be drained off to waste in order to maintain an acceptable level of dissolved solids without chemical treatment. However, the cost of the water lost by using this procedure can become excessive and usually a limited controlled amount of water is "bled-off" while chemical treatment is being applied to the remaining water and this procedure has been found to be economically sound. The proper balance between the amount of bleed-off and the extent of chemical treatment occurs when the amount of dissolved solids in the circulating water is maintained at between three and five times the normal concentration of the fresh or makeup water. To maintain these concentration levels the bleed-off water should be approximately one-half to one gallon per hour per ton of refrigeration (or its equivalent) capacity. Thus, a ten ton capacity system would have to have five to ten gallons of basin water per hour "bled-off" to hold the solids concentration within the three to five multiple range.

Heat from any process such as a building is transferred to the circulating cooling water through a gas or liquid media and the heat is then transferred primarily by the water vapor in the air. Since the latent heat of vaporization of water is 1,000 BTU's per pound, each pound of water evaporated will absorb 1,000 BTU's from the heat transfer system. A total heat content of 15,000 BTU's per hour evaporated is one ton of refrigeration. To absorb 15,000 BTU's of heat per hour requires the vaporization of 15 pounds of water per hour, $15,000 \div 1,000 = 15$ lbs. and 15 lbs. $\div 8.35$ lbs./gallons $= 1.8$ gallons of refrigerating capacity. A ten ton cooling unit would therefore have an evaporation loss of 18 gallons, 150 pounds of water or 150,000 BTU's ($18 \times 8.35 = 150$ lbs. $\times 1000$).

Hence a ten ton cooling unit operating at full load capacity requires the evaporation of 18 gallons of water per hour with a bleed-off of 5–10 gallons of water per hour or $18 \div 5$ to $10 = 3.6$ to 1.8. Thus, for each 1.8 to 3.6 gallons of water evaporated, one gallon must be bled-off to maintain the cycles of concentration desired for a ten ton unit.

Thus, in the United States, air conditioning and refrigerating systems are rated in "tons" and an evaporative cooling ton is equivalent to a heat load of 15,000 BTU's per hour. Since a BTU is a measurement of heat, the temperature measurements provides a convenient and accurate measurement of system tonnage and bleed-off.

In an effort to maintain the proper cycles of concentration of chemical balance in the recirculating water, prior devices and methods have employed conductivity or resistant measurement, pH probes, intermittantly activated water meters, timers and other devices. However, none of the methods or systems which have been in use in the past provide the desired results and they have not established the necessary mathematical relationship between evaporation in BTU's, heat load upon the system, bleed-off and/or modulating between no load and full load tonnage of the system, automatically.

Conductivity and resistance devices also measure or read the chemicals introduced to prevent corrosion, scale, and microbiological growths. Often the chemicals used exceed the natural total dissolved solids and can mask the readings of the circulating water taken thus causing excessive bleed-off. Chemically speaking there is no mathematical relationship between conductivity or resistance of basin circulating water and tons of refrigeration/bleed-off as measured in gallons or pounds or BTU's.

Timing devices cannot modulate between no load and full load tonnage capacity and such timers are only correct twice daily and are only effective under fixed prescribed conditions.

With this background in mind the present invention was conceived and one of its objectives is to provide an efficient and easily monitored system for maintaining the totally dissolved solids in the recirculating water at any desired level of concentration.

It is another objective of the present invention to conserve energy and to reduce the amount of treated water which is bled-off by improving the sensitivity and efficiency over known systems.

It is still another objective of the present invention to provide a method for automatic blowdown to prevent an excessive buildup of dissolved solids or undesired materials in the recirculating water by maintaining a desired mathematical ratio between the evaporated to bleed-off water.

Another objective of the present invention is to provide a method for blowdown which is easily adjusted to conform to 1° F. for temperature changes of the circulating water temperature and to modulate between no load and full load tonnage of the system automatically.

It is still another objective of the present invention to provide a blowdown method which will add makeup water in direct proportion to the amount of blowdown, automatically.

Another objective of the present invention is to provide a fail-system to shut down during power failures.

Also an objective of the present invention is to provide a blowdown system of one convenient size which will fit practically all circulating water systems regardless of their size or capacity.

Various other objectives and advantages of the present invention will become apparent to those skilled in the art upon review of the detailed description of the invention as set forth below.

SUMMARY OF THE INVENTION AND DESCRIPTION OF THE PREFERRED EMBODIMENT

The present invention comprises a method for controlling blowdown of recirculating cooling water by sensing the temperature of the circulating water and converting the temperature to a transmittable signal which is sent to a blowdown valve for actuating the valve to thereby discharge a portion of the circulating water. The blowdown valve may be of the pneumatic type which will quickly respond as required. Thus, an increased heat load on the cooling system will therefore directly increase the temperature of the cooling water and thereby open the blowdown valve while simultaneously allowing fresh makeup water to flow into the system to maintain a desired concentration. Chemical pumps may also be employed to insure porper chemical additions to the circulating water.

In the preferred method of controlling blowdown an immersible probe for sensing the temperature of the circulating water is positioned in the system between the refrigerant condenser and the cooling tower. A control means is in communication with the immersed sensor means and said control means will transmit a signal to the blowdown valve means if the water temperature is 1° F. above a predetermined maximum. The control means of the preferred embodiment has adjustable set points and is provided with pneumatic fittings to control air pressure in communication with the blowdown valve means to quickly and efficiently modulate the said blowdown valve means to assist in insuring a proper concentration of cycles for the circulating water. The blowdown valve means of the preferred embodiment is regulatable in increments which conform to 1° F. temperature changes in the circulating water and to the set points on the control. Thus, depending on the water temperature the blowdown valve means will modulate in either an opened or closed direction varying as the temperature of the circulating water changes.

Figure 2:
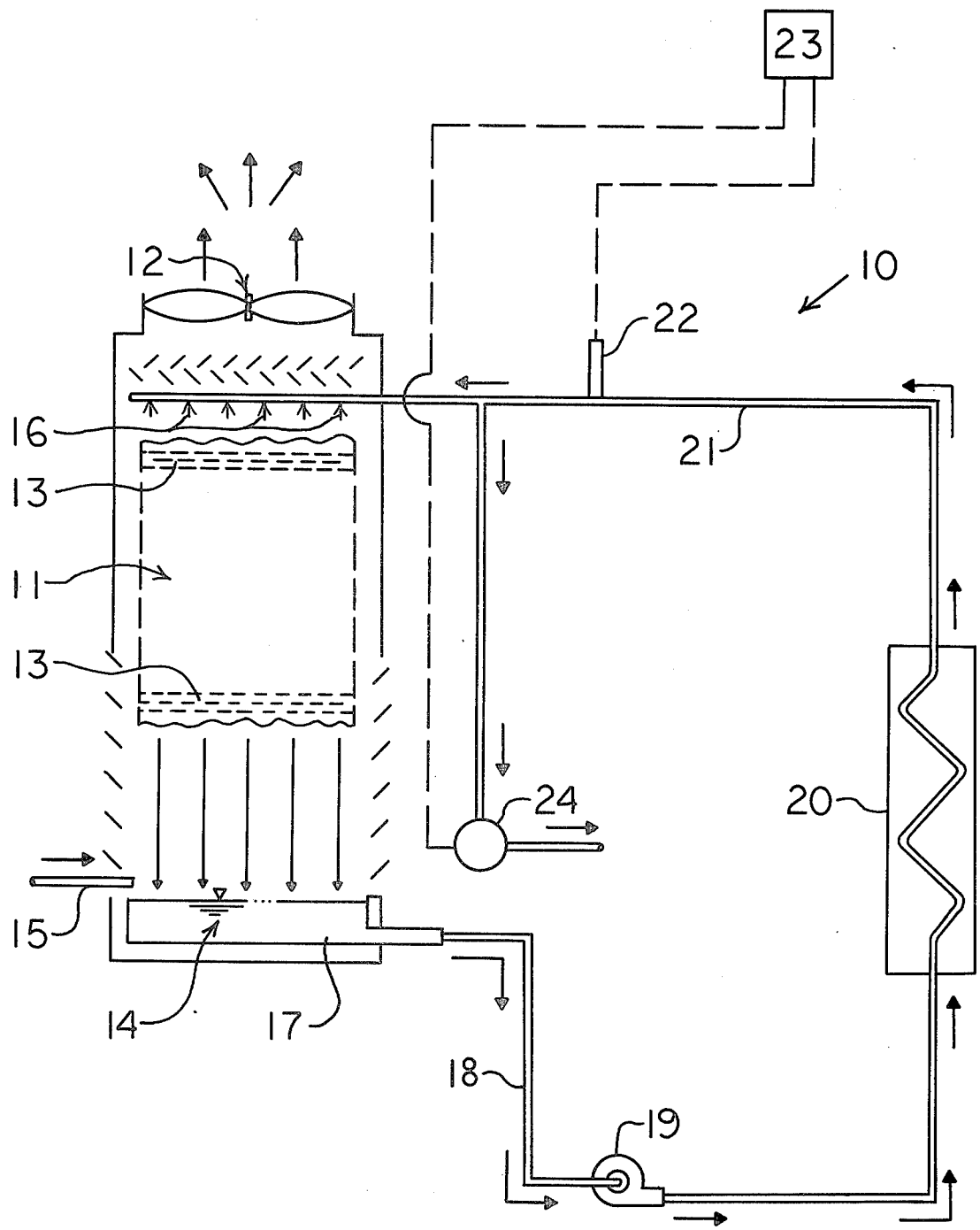
FIG. 2 demonstrates a flow diagram of a typical recirculating water system employing the invention.

For a more detailed description of the invention, recirculating cooling water system 10 as shown in FIG. 2 has cooling tower 11 which includes fan means 12, fill 13 and basin 14. Fresh or makeup water is supplied to basin 14 by makeup line 15. As would be understood air is drawn by fan means 12 through the recirculating water spray 16 where said water is cooled as it cascades downwardly along tower fill 13 to basin 14. Cooled basin water 17 is then urged through pipe means 18 by pump means 19 and is delivered to refrigerant condenser 20 where the recirculating water absorbs heat in proportion to the heat load on the system. The heated water then passes out of refrigerant condenser 20 and is returned to cooling tower 11 through pipe means 21 where the cycle begins again.

In accordance with the method of the present invention, the circulating water passes by temperature sensing means 22 which is in communication with control means 23. Control means 23 may be for example a pneumatic proportioning controller such as Honeywell T-P954A which "reads" the signal from temperature sensing means 22. Control means 23, in accordance with preset adjustable standards, modulates opened or closed valve means 24 which may be for example a Honeywell Valve Control Angle Valve. Thus, by modulating valve means 24 to an opened or closed position, the recirculating water flowing through pipe means 21 is "blown-down" or bled-off according to the temperature of the reciruclating water and/or heat load on the system. As water is bled off, makeup water may be added to the system through makeup line 15 by the addition of another valve (not shown) attached to makeup line 15 which may also be controlled by control means 23 to maintain the amount of water in the recirculating system at a constant volume. Temperature sensing means 22 by being submerged in the circulating water senses the temperature of said water and directs a signal as aforementioned to control means 23. Control means 23 can be regulated so that when it receives a signal from temperature sensing means 22 indicating that the water is above a certain prescribed temperature, it then directs a signal which may be for example of the pneumatic or electrical type to valve means 24 causing valve means 24 to open and thus discharge water from pipe means 21. Control means 23 can be regulated whereby each 1° F. change in the temperature of the recirculating water causes valve means 24 to modulate between opened and closed positions corresponding to direct changes in the heat load (tonnage) changes. The amount of opening of valve means 24 would depend on the temperature of the recirculating water and the actual tonnage demands of the particular cooling system at a given instance.

As mentioned above control means 23 can be used also to control additional makeup water and causes it to flow into the recirculating system and can also be used to regulate chemical additions to the system as blowdown is undertaken.

Figure 1:
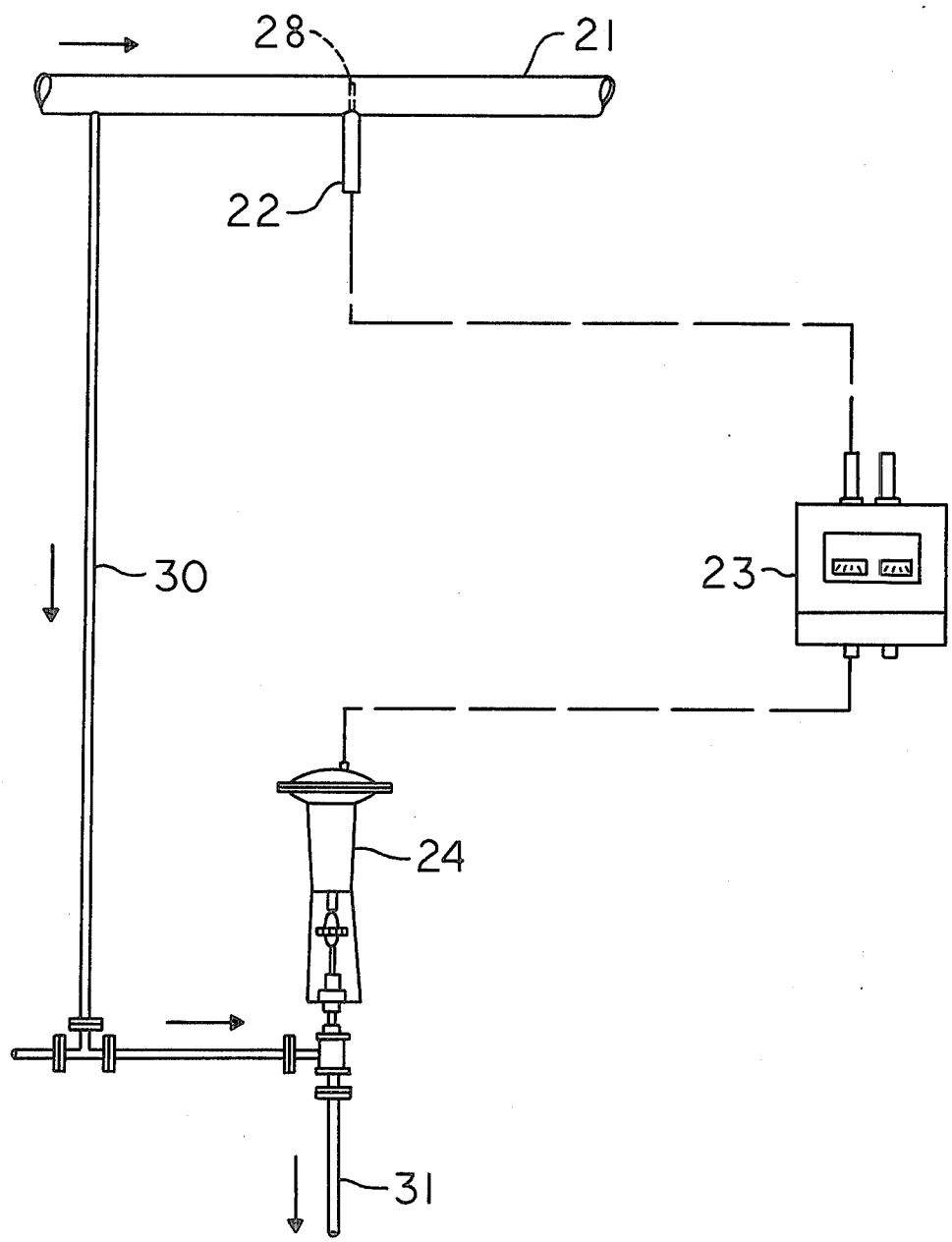
FIG. 1 demonstrates in schematic fashion the apparatus used in conjunction with the present invention.

In FIG. 1 submerged thermostatic means 28 is shown as a componant of sensing means 22 in pipe means 21. Sensing means 22 and control means 23 along with valve means 24 may be of the pneumatic variety or may be electrically activated by an electrical signal from sensing means 22 for opening or closing as required and of course when opened allows water to flow through pipe means 30 and 31 to waste. As would be understood the cycles of concentrations of the dissolved minerals in the makeup water would be automatically held to the optimum 3-5 cycles in the recirculating water in a system employing the invention or may be programmed to hold any desired cycle of concentration.

Also, as would be understood the chemical concentrations are changed as the recirculating water is bled-off and fresh makeup water is added. As the heat load on the system employing the apparatus as shown herein increases, more bleed-off occurs and the chemical concentrations in the recirculating water decrease if no additional chemicals are added.

Various modifications of the apparatus as described above can be made by those skilled in the art without departing from the scope of the invention.

I claim:

1. A method of controlling blowdown of an open recirculating cooling water system in direct proportion to the heat load on the system having a refrigerant condenser means and a cooling tower, to control the concentration of impurities in the water and to improve the efficiency of the system, comprising the steps of: sensing the temperature of the circulating water as it passes from the refrigerant condenser to the cooling tower by a sensor means, transmitting a signal from the sensor means to a control means having a temperature sensitivity adjustment, transmitting a signal from the control means to a blowdown valve means and regulating said blowdown valve means in accordance with the temperature changes of the circulating water.

2. A method of controlling the blowdown of an open recirculating cooling water system as claimed in claim 1, wherein regulating said blowdown valve means comprises regulating said valve means in increments according to 1° F. temperature changes of the circulating water.

3. Recirculating water blowdown apparatus for use in open recirculating cooling water systems having a refrigerant condenser and a cooling tower comprising: pipe means, said pipe means communicating with the cooling tower for forming a circulating path therewith, pump means, said pump means joined to said pipe means for directing water along said pipe means, water temperature sensor means, said sensor means positioned in said pipe means between the refrigerant condenser and the cooling tower, control means, said control means having a temperature sensitivity adjustment, said control means communicating with said sensor means, blowdown valve means, said valve means positioned in said pipe means and communicating with said control means whereby said control means regulates said valve means to effect blowdown in accordance with the temperature changes of the water.

4. Recirculating water blowdown apparatus as claimed in claim 3 wherein the sensor means is positioned in said pipe means downstream of the condenser and upstream of the cooling tower.

5. Recirculating water blowdown apparatus as claimed in claim 3 wherein said control means is adjustable to sense 1° F. temperature changes in the water.

6. A method of controlling blowdown in circulating cooling water as claimed in claim 1 wherein the step of sensing the temperature of the cooling water comprises sensing the water temperature by a submerged sensor means.

7. A method of controlling blowdown of circulating cooling water as claimed in claim 1 wherein regulating a blowdown valve means comprises the step of opening the valve means provided the circulating water is above a selected temperature.

8. A method of controlling blowdown of circulating cooling water as claimed in claim 1 wherein regulating a blowdown valve means comprises the step of maintaining a valve means closed provided the temperature of the circulating water is below a selected temperature.

* * * * *